UNITED STATES PATENT OFFICE.

CHARLES J. GREENSTREET, OF INDIANAPOLIS, INDIANA.

PROCESS OF MAKING NITROGENOUS COMPOUNDS.

1,052,815.  Specification of Letters Patent.  Patented Feb. 11, 1913.

No Drawing.  Application filed May 25, 1908. Serial No. 434,744.

*To all whom it may concern:*

Be it known that I, CHARLES J. GREENSTREET, a citizen of the United States of America, residing in Indianapolis, in the county of Marion and State of Indiana, have invented certain new and useful Improvements in Processes of Making Nitrogenous Compounds, of which the following is a full, clear, and exact description.

My invention relates to a process of making nitrogenous compounds, and it has for its object the carrying out of a process of this description at a much lower temperature than that required in carrying out the processes of making nitrogenous compounds as heretofore practised.

I have discovered that when a hydrid, such as a hydrid of an alkaline earth metal is heated to a temperature above a dark red heat in the presence of carbon and also in the presence of calcium chlorid, and nitrogen is passed over either the heated hydrid and carbon or the heated hydrid carbon and calcium chlorid, there is formed a compound containing a high percentage of nitrogen and differing in most of its chemical properties from other heretofore discovered commercially useful nitrogen compounds. This compound, which is a mixture of cyanamid, cyanid, dicyanamid and free carbon, is also entirely free from the commercially objectionable properties of calcium chlorid of taking up moisture from the air and making the resulting compound unfit for commercial uses, or of any possibility of its destroying the nitrogen compound itself. I am of the opinion the polymerization gives the unusual properties, for in this case no moisture is taken up by the calcium chlorid, which differs from previous methods and results. The temperature at which the different reactions take place cannot be given except in wide variation as stated, for the temperature varies with the quantity of catalytic agent used and the final product obtained. The temperature varies also largely with the catalytic agent employed and the results are different where an excess of catalytic agent serves in addition to bringing about a different resulting chemical compound. This may be occasioned by an impurity in the original ingredients, for example, calcium chlorid would tend to give cyanamid mixture, while ferric chlorid would tend toward cyanid compounds, and mixtures of these would give both compounds, the temperatures under such conditions being necessarily quite varied. The question of the substances mentioned being catalytic agents, or fluxes, is still an open question, but for the purposes of this application, I have considered them as the former. I have also discovered that when this nitrogen compound is decomposed with steam or hot water, there is thrown off therefrom ammonia, and that when this ammonia is passed over a catalytic substance in the presence of oxygen, nitric acid is produced, or if a base, such for instance as oxid of calcium is used, nitrites and nitrates are produced. I am further aware that the compound is capable of producing a wide range of additional commercially useful compounds.

In carrying out my process in practice, the hydrid used may be made by any of the well known methods, but I prefer in making it to use calcium carbid or any carbid that will not melt at a red heat, and mix it with calcium chlorid, the proportions of these substances being preferably approximately twenty per cent. of calcium chlorid and eighty per cent. of other carbid. I heat the calcium carbid and calcium chlorid to a temperature above a dark red heat, preferably a cherry red heat, say about 1600° Fahrenheit and pass over the calcium carbid and calcium chlorid so heated, hydrogen or any artificially produced gas, for example, producer gas, which contains hydrogen and has been freed of such compounds as carbon monoxid and carbon dioxid, which are capable of destroying the carbid itself or of turning it into other compounds than a hydrid. In passing hydrogen or any other suitable gas, as mentioned, over this mixture containing calcium chlorid, I secure calcium hydrid and free carbon. In this respect the step in my process just recited involves a different action from that contemplated in statements heretofore made to the effect that in passing hydrogen over calcium carbid, acetylene is formed. After the reaction of making a hydrid has been completed, I pass nitrogen, free from oxygen, over the mixture of hydrid, free carbon and calcium chlorid heated to a temperature above a dark red heat, until a nitrogen compound is formed. I would here state that I may, in certain instances, dispense with the use of calcium chlorid and pass the nitrogen over a mixture consisting only of calcium hydrid and free carbon heated above a dark red heat. During the carrying out of the step in my process which has just been described, at least a portion of the hydrogen in the hydrid during its conversion into a nitrogen compound, passes off combined with nitrogen as free ammonia. This free ammonia may be caught by passing it into an acid solution or in any other suitable manner.

The equations are as follows:

$$CaC_2 + 2H = CaH_2 + 2C.$$
$$3CaH_2 + 4C + 8N = 3CaCN_2 + C + 2NH_3.$$

These equations are general and do not cover the different catalytic substances; for example, should ferric chlorid be used, the last equation would be:

$$3CaH_2 + 4C + 6N + Fe_2Cl_6 =$$
$$3CaCN_2 + C + H_6 + Fe_2Cl_6$$

or $$3CaH_2 + 4C + 8N + Fe_2Cl_6 =$$
$$3CaCN_2 + C + 2NH_3 + Fe_2Cl_6$$

The non-volatile nitrogenous compound resulting from the carrying out of my process is a heavy black powder with a considerable percentage of free carbon and analyzing on an average nineteen per cent. nitrogen—two per cent. of the nitrogen being in cyanids and seventeen per cent. of the nitrogen being in cyanamid and its polymers. As a result of chemical reaction the compound includes polymerized compounds of acid amids among which are cyanamid, dicyanamid and cyanuramid with a small percentage of cyanids. These polymerized compounds are susceptible of being converted into various valuable chemical compounds, such, for instance, as urea, creatin and guanadin. This compound can be used without further change as a fertilizing material or hot water and steam can be used to break up the compound into ammonia.

The polymerized compounds of acid amids above mentioned are, after production, broken up by subjecting them to the action of steam or hot water, after which the resultant ammonia gas is led over a catalytic agent or substance, such as platinized asbestos, which has been heated to a temperature of preferably 300° centigrade, in the presence of free oxygen. Thus the ammonia gas arising from this step in my process is converted into nitric acid or is susceptible of being converted into nitrites, nitrates and various compounds into which nitrogen commonly enters.

I desire to state in conclusion that I may, in carrying out my process, instead of using a carbid and calcium chlorid and passing hydrogen over these elements to produce a hydrid and free carbon, omit the calcium chlorid and use with the carbid a fluorid or sulfate or an alkali or an alkaline earth for the production of the hydrid and free carbon. Also that instead of using a hydrid, free carbon, and calcium chlorid in the production of the nitrogenous compound, I may utilize a hydrid, free carbon, and instead of calcium chlorid, a fluorid or sulfate of an alkali or an alkaline earth. I would further mention that calcium chlorid, a fluorid or a sulfate of an alkali or an alkaline earth are to be considered herein as analogous in action to each other, and are herein considered as fluxes or catalytic agents, or in other words, agents that have the property of providing for the production of a nitrogenous compound at a lower temperature and consequently at a less expense than that incident to the production of nitrogenous compounds by the processes heretofore in vogue.

I claim:

1. The herein described process of producing a nitrogenous compound, which consists in passing nitrogen over a hydrid and carbon heated to a temperature above a dark red heat, substantially as described.

2. The herein described process of producing a nitrogenous compound, which consists in passing nitrogen over a hydrid, carbon, and an alkaline earth compound, heated to a temperature above a dark red heat, substantially as described.

3. The herein described process of producing a nitrogenous compound, which consists in passing nitrogen over a hydrid, carbon and calcium chlorid heated to a temperature above a dark red heat, substantially as described.

4. The herein described process of producing a nitrogenous compound, which consists in first passing hydrogen over a carbid to form a hydrid and carbon, and then passing nitrogen over the hydrid and carbon heated to a temperature above a dark red heat.

5. The herein described process of producing a nitrogenous compound, which consists in first passing hydrogen over calcium carbid to form calcium hydrid and carbon, and then passing nitrogen over the calcium hydrid and carbon heated to a temperature above a dark red heat.

6. The herein described process of producing a nitrogenous compound, which consists in first passing hydrogen over a carbid in the presence of a catalytic agent to form a hydrid and carbon, and then passing nitrogen over the hydrid and carbon heated to a temperature above a dark red heat.

CHAS. J. GREENSTREET.

In the presence of—
LILY ROST,
BLANCHE HOGAN.